Dec. 19, 1939.   C. T. PFLUEGER   2,184,242
FISHING REEL
Filed March 22, 1937
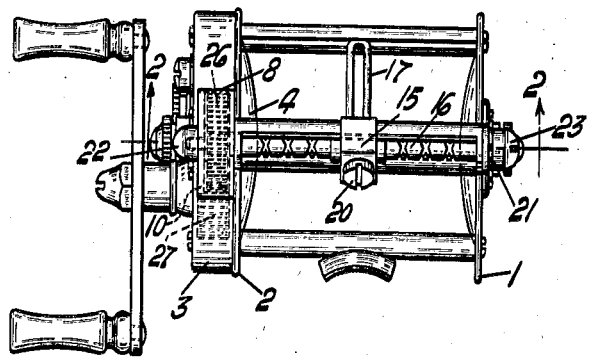
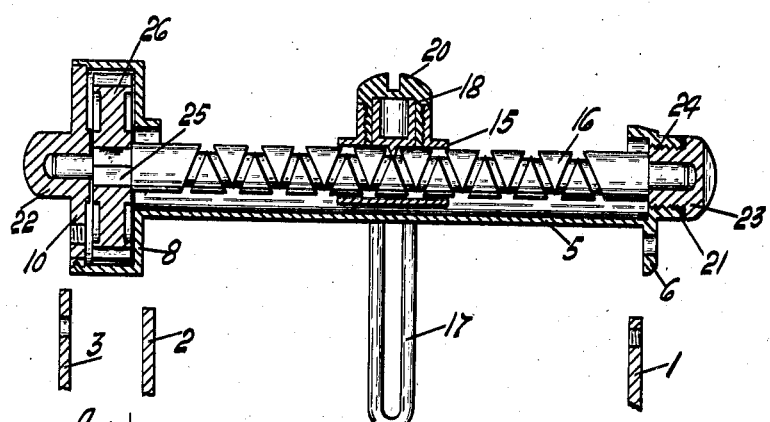
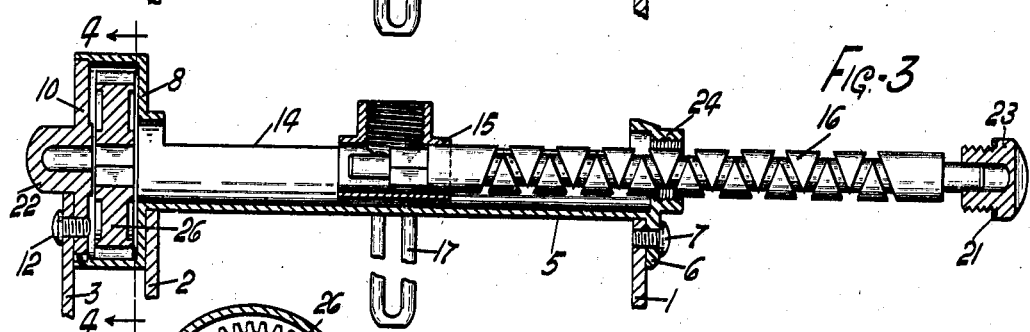
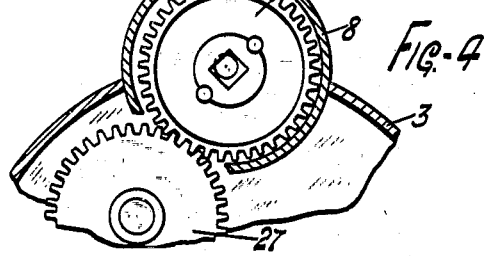
INVENTOR
CHARLES T. PFLUEGER
BY Albert L. Ely
ATTORNEY Patented Dec. 19, 1939

2,184,242

UNITED STATES PATENT OFFICE 2,184,242

FISHING REEL

Charles T. Pflueger, Akron, Ohio, assignor to The Enterprise Manufacturing Company, Akron, Ohio, a corporation of Ohio Application March 22, 1937, Serial No. 132,207

1 Claim. (Cl. 242—84.4)

The present invention relates to the art of fishing reels and its object and purpose are to improve upon an existing type of reel insofar as the means by which the level wind mechanism may be removed for cleaning and repair.

The present invention is for an improvement in that type of fishing reel shown in the Adams et al. Patent No. 1,691,622 of November 13, 1928, to which reference is made for the detailed construction of such parts of the reel as are not essential to the understanding of the present invention.

It is the purpose of the invention to devise a reel of the type in which the level winding mechanism is removable, both as a complete unit with the shaft, operating gear, tube and other parts of the device, and also in which the level winding shaft and carriage alone may be removed without disconnecting any other part of the reel, the driving gear for the shaft remaining in place in the reel, together with the surrounding tube and other parts thereof. So far as known to me, no other reel has been capable of this dual operation.

It is also a purpose of the invention to modify a reel of the general type shown in the Adams patent aforesaid, so that the new and improved results specified herein may be secured.

Other objects and advantages are secured by the invention, but it will be understood that the invention may be modified and altered in its various adaptations without following the specific details shown and described. It is not intended that the embodiments of the invention shall conform in detail to the exact form shown herein.

In the drawing in which the preferred form of the invention is shown:

Fig. 1 is a side elevation of a complete reel of the type shown in the Adams patent, equipped with the new and improved elements;

Fig. 2 is a cross-sectional view on the line 2—2 of Fig. 1, showing the level winding unit lifted from its position or seat in the reel frame;

Fig. 3 is a view, in section, showing the manner in which the level winding shaft and carriage may be removed without detaching the entire device from the reel; and Fig. 4 is a section on the line 4—4 of Fig. 3.

It will be seen by a comparison of Figs. 2 and 3 that either method of disconnecting the level winding carriage and shaft may be employed. If only the shaft and carriage require attention, then the method shown in Fig. 3 is employed. If, however, the gears and bearings have to be attended to as well, the fisherman may use the method shown in Fig. 2, so that when the entire device is removed, it may be wholly disassembled. Situations may arise in which either one or the other of such systems may be employed and by the construction shown either system is available.

The mechanism by which these improved results are accomplished will now be described.

The rear end plate of the reel is shown at 1, the front end plate at 2 and the gear casing or cap at 3. The spool 4 is mounted between the end plates and the gearing for driving the spool and the level winding device is housed in the casing 3. The edges of the parts 1, 2 and 3 are notched or recessed to provide a seat for the level winding device which consists of the tube 5 having a flange or ear 6 which fits down on the side of the plate 1 and is held in position by the screws 7. The opposite end of the tube is formed with an enlarged circular housing 8 which fits between the plate 2 and the casing 3. The end of this housing is closed by a removable plate 10, screws 12 passing through the casing 3 into the plate to hold the level winding mechanism in position at this side of the reel.

The side of the tube 5 is slotted or cut away, as at 14, to permit the travel of the carriage 15 which surrounds the double-threaded shaft 16 upon which it travels. A line guiding eye 17 extends from the carriage and a pawl or half nut 18 engages the threads upon the shaft and is held in position on the carriage by the removable cap 20 which, when taken off, permits the half nut to be removed and frees the carriage from the shaft.

The shaft 16 is supported at the casing end of the reel in the bearing 22 on the plate 10 and at its opposite end in a bearing in the removable cap 23 which is screwed into an opening in the housing 24 on the end of the tube 5, said opening being of larger diameter than said shaft. A lock washer 21 may be used at this point. Adjacent the bearing 22 the end of the shaft is formed with a square tang or formation 25 which loosely fits in the gear 26 which drives the screw shaft from the main gear 27 of the reel, as will be understood from the Adams patent.

When the cap 23 is removed from its place in the housing 24, the shaft 16 may be withdrawn endwise from the reel and out of the gear 26 which is retained in position by the partially encircling housing. The gear 26 is thus retained in its position in the reel even though the shaft may be withdrawn, and it is possible to operate the reel as a complete operative structure with the shaft removed.

In the preferred form of the invention, it is desirable to remove the cap 20 and half nut 18 which will free the carriage from the shaft and permit the disassembly of the screw and carriage as shown in Fig. 3. However, if sufficient clearance is given about the shaft at the bushing 23, the mechanism may be removed by a slightly modified series of operations, namely, by moving the shaft to the right sufficiently to clear the gear and then tipping the shaft until it clears the gear casing 8 and lifting out the shaft and carriage by shifting it to the left.

In either case the shaft and carriage may be reassembled in the reel by a reversal of the steps.

By the operations illustrated in Fig. 2, it is possible to remove the tube 5 and all of the parts which it carries and supports by removing the screws 7 and 12, whereupon the entire unitary assembly may be lifted from its seat in the reel frame.

The advantage of the present invention is that either one of the methods of disconnecting the level winding device is possible of operation without in any way affecting the practicability of the other. This novel and useful combination of elements is wholly new and is practical and useful in this field.

What is claimed is:

In a fishing reel the combination of a reel frame, and a level wind mechanism attached thereto, said mechanism comprising a casing consisting of an integral gear housing and axially disposed tube, a screw threaded shaft therein and a driving gear in releasable engagement with the shaft, said gear housing on the tube partly encircling the gear, releasable means to hold the casing upon the reel frame but enabling it to be removed as a unit, a removable shaft bearing carried by the tube at the end thereof remote from the gear housing enabling the shaft to be removed from the casing while the latter is attached to the reel frame, said bearing consisting of an exteriorly threaded cap that is screwed into an opening in the end of the tube, which opening is of larger diameter than said shaft, said cap being formed with a bearing recess that receives a journal of reduced diameter on the end of the shaft, and a lock washer interposed between the end of the tube and the head of the cap.

CHARLES T. PFLUEGER.